No. 666,176. Patented Jan. 15, 1901.
G. C. BLICKENSDERFER.
TYPE WRITING MACHINE.
(Application filed Jan. 3, 1900.)

(No Model.) 8 Sheets—Sheet 1.

Witnesses
F. P. Prindle.
Jno. Murie

Inventor
George C. Blickensderfer,
By Wm. C. McIntire atty

No. 666,176. Patented Jan. 15, 1901.
G. C. BLICKENSDERFER.
TYPE WRITING MACHINE.
(Application filed Jan. 3, 1900.)

(No Model.) 8 Sheets—Sheet 2.

Witnesses
F. P. Prindle

Inventor
George C. Blickensderfer
By Wm C. McIntire atty

No. 666,176. Patented Jan. 15, 1901.
G. C. BLICKENSDERFER.
TYPE WRITING MACHINE.
(Application filed Jan. 3, 1900.)
(No Model.) 8 Sheets—Sheet 7.

Witnesses
F. P. Prindle.
Jos. Smith

Inventor
George C. Blickensderfer,
By Wm. C. McIntire atty

No. 666,176. Patented Jan. 15, 1901.
G. C. BLICKENSDERFER.
TYPE WRITING MACHINE.
(Application filed Jan. 3, 1900.)
(No Model.) 8 Sheets—Sheet 8.

Witnesses:
F. P. Prindle.

Inventor:
George C. Blickensderfer,
By McIntire, atty.

UNITED STATES PATENT OFFICE.

GEORGE C. BLICKENSDERFER, OF STAMFORD, CONNECTICUT.

TYPE-WRITING MACHINE.

SPECIFICATION forming part of Letters Patent No. 666,176, dated January 15, 1901.

Application filed January 3, 1900. Serial No. 208. (No model.)

*To all whom it may concern:*

Be it known that I, GEORGE C. BLICKENS­DERFER, a citizen of the United States, resid­ing at Stamford, in the county of Fairfield and State of Connecticut, have invented cer­tain new and useful Improvements in Type-Writing Machines; and I do hereby declare the following to be a full, clear, and exact de­scription of the invention, such as will enable others skilled in the art to which it appertains to make and use the same.

My invention relates to certain new and use­ful improvements in type-writing machines, and particularly to that class known as "ci­pher-machines."

The class of machines referred to are de­signed to transcribe an intelligent message into an unintelligible and confused message which requires subsequent translation, and they have therefore been so constructed that the type-selecting devices will arbitrarily se­lect printing characters different from the suc­cessive characters of the message designed to be transmitted, thus producing, as stated, an unintelligible message, requiring translation after receipt through the medium of a key agreed upon between the sender and the re­ceiver of the message. In all machines of this character with which I am familiar the relation between the type-selecting device and the printing devices is such that the frequency or recurrence of given characters in the print­ed message constitutes in itself a key by which the message may be translated. This result is due to the fact that there being a fixed re­lation between the type-selecting devices and the printing devices such relation can by care­ful study be worked out or determined through the relation and frequency of given characters.

My invention has for its object to produce a machine which shall be capable of convert­ing an intelligible message into an unintelli­gible one which shall not involve the fre­quency or recurrence of characters referred to and which will also readily translate such message back to the original; and with these ends in view my invention consists of a ma­chine provided with a type-wheel having printing characters thereon and devices for selecting characters upon the wheel and bring­ing them into printing position, and also de­vices intermediate of the type-wheel and the type-selecting devices and independent of the latter for automatically and irregularly changing the relation between the type-wheel and type-selecting devices.

In order that those skilled in the art to which my invention appertains may know how to make and use the same, I will proceed to describe the construction and operation of my improved machine, referring by letters and figures to the accompanying drawings, in which—

Figure 1 is a perspective view of the ma­chine from the left side.

Similar characters denote like parts in the several figures of the drawings.

Figure 2:
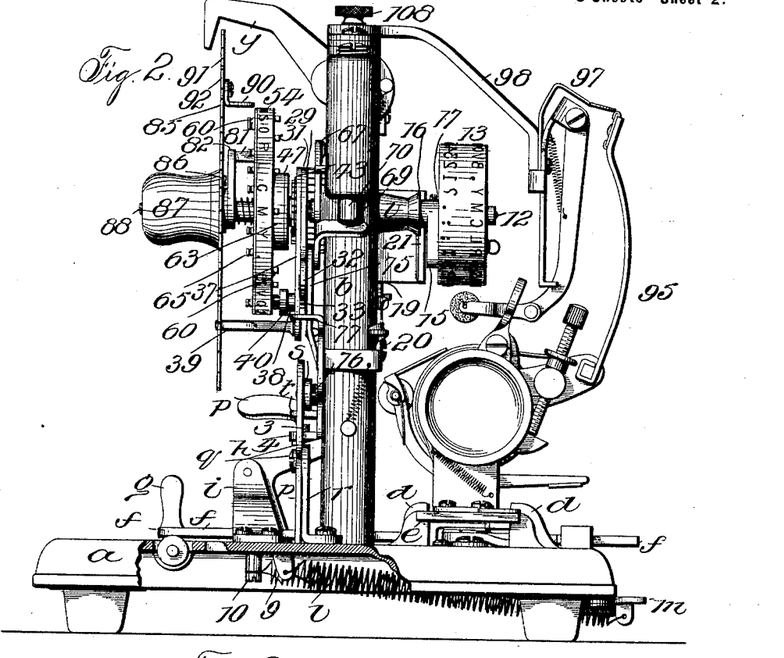
Fig. 2, an elevation of the same from the right side.
Figure 4:
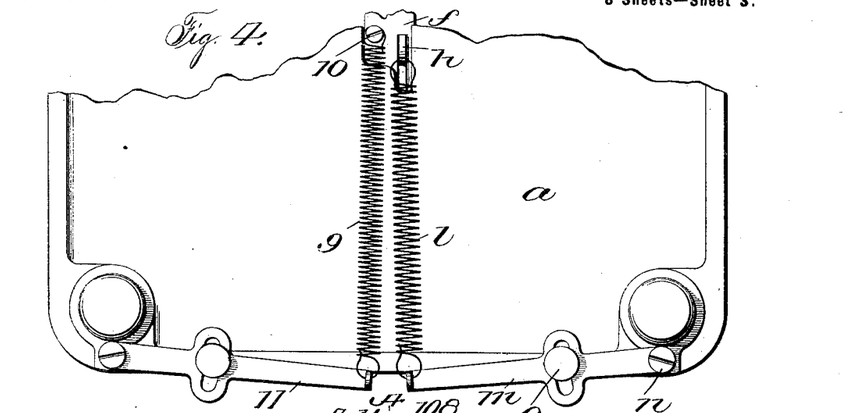
Fig. 4, a view of the under side of the base of the machine, showing a means for adjusting the springs which control the feed and the vertical movement of the printing mechan­ism.

$a$ represents the base-plate of the machine, from which rises about centrally a vertical pillar or frame $b$, which constitutes the support of the printing mechanism and inking device. This pillar is preferably cast integral with the base-plate and is bifurcated vertically, as clearly shown in Figs. 5, 8, 9, 10, 11, and 12, and the bifurcated legs are each formed on the inside with a vertical groove adapted to receive a vertically-reciprocating plate $c$, which supports and carries the printing-wheel and the mechanism controlling its rotative action. The base-plate $a$ is formed with lugs $d$, which are grooved to receive the feed-bar or base-plate $e$ of the paper-carriage, which is caused to travel by any suitable feed mechanism, but preferably such as illustrated and described in Letters Patent No. 621,742, granted to me on the 21st day of March, 1889, wherein the paper-carriage is caused to travel through the medium of a dog operated by a sliding feed-plate $f$, which is operated by a hand-knob $g$ or through the medium of a bell-crank lever $h$, pivoted to a bracket $i$, secured by screws to the bed-plate $a$, as clearly shown at Fig. 2. The lower arm of the lever $h$ extends through a longitudinal slot in the sliding feed-plate $f$ and the upper arm contacts with an adjustable stop $j$, secured to the lower end of the vertically-reciprocating plate $c$, and to avoid friction the end of the arm of the lever is equipped with an antifriction-wheel $k$, Fig. 5, and the end of the lower arm of this lever is connected with a spiral spring $l$, (see Figs. 2 and 4,) the other end of which connects with an arm $m$, pivotally connected with the under side of the bed-plate $a$ by a screw $n$ and is adjustable through the medium of a transverse slot in the arm $m$ and a set-screw $o$, as clearly shown at Fig. 4. From this construction it will be seen that the feed-plate $f$ may be reciprocated toward the front of the machine by the knob $g$ and carried back to its normal position by the spring $l$, thus feeding the paper-carriage one space, the bell-crank lever $h$ remaining passive, and that likewise when the vertically-reciprocating plate $c$ is caused to move downwardly the contact of the stop $j$ with the end of the bell-crank lever $h$ will cause the latter to rock on its pivotal connection with the bracket $i$, and the lower end contacting with the plate $f$ at the end of the longitudinal slot therein will pull the plate toward the front of the machine a distance sufficient to cause the return movement of said plate through the intermediate feeding-dog to feed the paper-carriage a distance equal to one space.

The vertically-reciprocating plate $c$ is caused to descend through the medium of a hand-lever $p$, pivoted at $q$ to metal bracket $r$, secured by screws to the bed-plate $a$. The extreme end of the lever $p$, below its pivotal point $q$, is formed to contact with the bed-plate $a$, as clearly shown at Fig. 5, and thus to limit the upward movement of the opposite free end, which is flattened, as shown, to receive pressure by the finger of the operator. This lever is provided at about the center of its length with an antifriction-roller $s$, adapted to contact with a foot $t$ at the lower end of a reciprocating plate $u$, lying against the plate $c$ and enlarged and cut away, as clearly shown at Fig. 28, to surround the hub $v$, extending outwardly from the plate $c$, and to permit of a slight reciprocating movement without contacting with said hub, for the purpose presently explained.

The upper end of the plate $u$ is provided or formed with a short forwardly-projecting arm $w$, (see Figs. 29 and 30,) which is pivotally connected by a screw $x$ to a vibrating detent $y$, which latter is pivotally connected at $z$ within a central slot in the upper end of the reciprocating plate $c$. (See Figs. 29 and 30.)

Figures 28, 29:
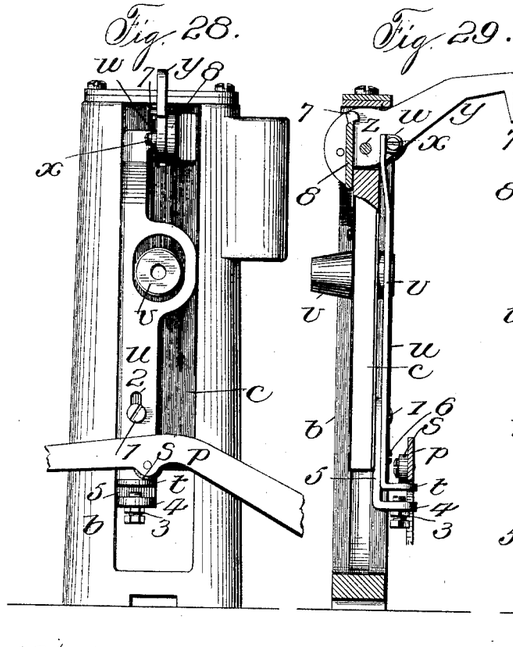
Fig. 28, a front elevation of the pointer and sprocket-stop-operating mechanism.
Fig. 29, a vertical section of the same with the stop elevated.

Just above the foot $t$ the plate $u$ is secured to the plate $c$ by a screw 1, passing through a slot 2 and into the said plate $c$, as clearly shown at Fig. 28. The vertical movement of the plate $u$ independently of the plate $c$ is just sufficient to bring the foot $s$ in contact with the adjustable stop 3, located in a foot 4, extending from a short flat leg 5, secured to the plate $c$ and between it and the plate $u$ by the screw 1 and another screw 6. (See Figs. 29 and 30.) This vertical movement of the plate $u$ causes the detent $y$ to vibrate from the position shown in Fig. 29 to that occupied in Fig. 30, which causes a laterally-projecting stud 7 on the detent to move from a position over the upper edge of a stop-plate 8, secured to the upper end of the vibrating plate $c$, as shown at Fig. 29, to the position shown at Fig. 30, coincident with the front face of the stop-plate 8. The movement described of the detent to the position shown in Fig. 30 causes it to interlock with the character-dial and to hold it against rotation, as will be hereinafter described.

Figure 30:
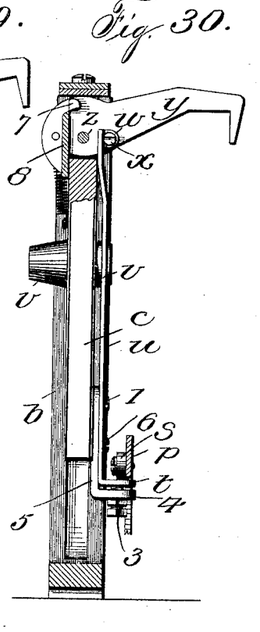
Fig. 30, a like view of the parts when the stop is in position to lock the dial and permit the slide to descend.

When the stud 7 is over the top edge of the stop-plate 8 the vertically-reciprocating plate c is locked against vertical movement, and when said stud occupies the position shown at Fig. 30 the plate c is free to move downwardly, for the purpose hereinafter explained.

Figure 6:
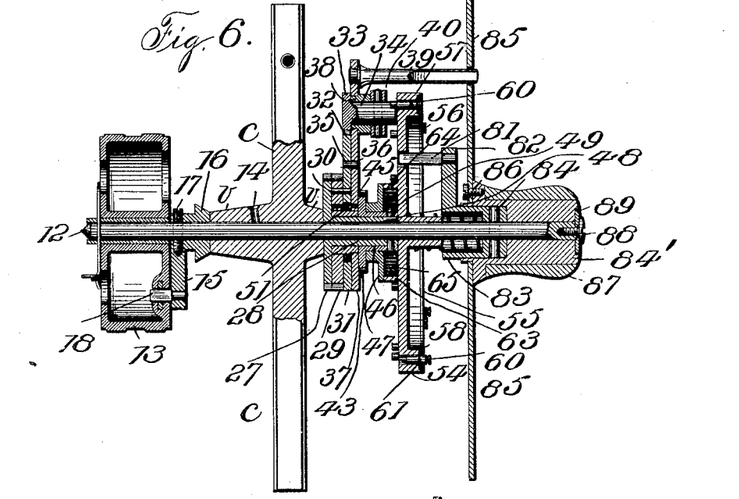
Fig. 6 is a vertical section on line A A of Fig. 5, showing the sliding type-wheel support and mechanism for controlling the movement of the type-wheel (but with the inking appara­tus and disk-stop mechanism removed) when the parts are in position to cause the print­ing of the alphabet or letters.
Figure 7:
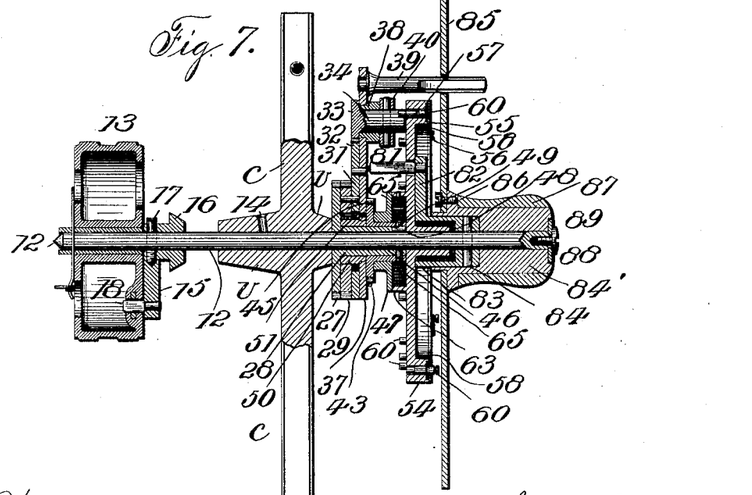
Fig. 7 is a simi­lar view on same line with the type-wheel shaft pushed to the rear, so that the numer­als and other characters may be printed.

A secondary spring 9, (see Fig. 4,) similar to the spring l, has one end connected by a screw 10 to the under side of the feed-plate f and the other end to an adjustable arm similar to the arm m and secured in like manner to the under side of the base-plate a. The spring 10 causes the feed-plate to return to its normal position after it has been reciprocated by hand, and also causes it to return when it has been forced forward by the lower end of the bell-crank lever q, as heretofore described. Referring especially to Figs. 6 and 7, to describe the construction and operation of the printing mechanism, 12 is the shaft upon which is mounted at the rear end a type-wheel 13, in the manner well known. This shaft 12 is located axially within the hub v of the vertically-reciprocating plate c and is lubricated through a radial oil-channel 14 in the hub v.

Figure 3:
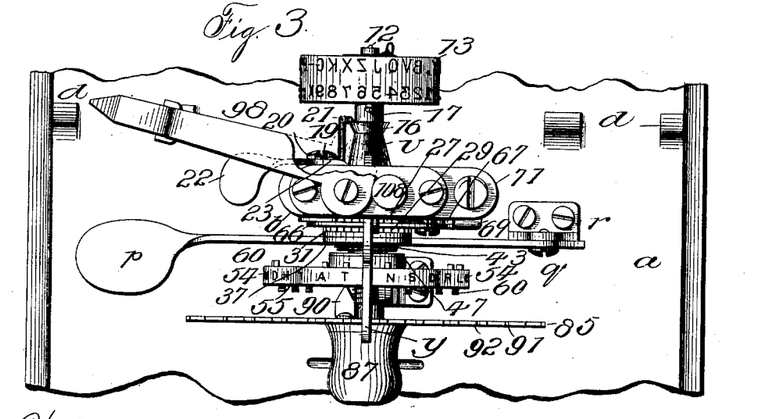
Fig. 3, a plan view of the head of the machine, the ink-roll holder being swung out of place to permit putting on or taking off of the type-wheel.

A crank 15, with a cone-shaped hub 16, is secured to the shaft 12 by a screw-pin 17 and is provided near its outer end with pin 18, adapted to enter a channel in the inner disk-face of the type-wheel 13 to secure the proper fixed relation between the type-wheel and shaft. The shaft is adapted to reciprocate in the hub v of the plate c, as shown at Fig. 7, in order that the inner row of characters on the periphery of the wheel may be brought into proper position to print upon the paper on the paper-carriage, but is held against reciprocation when the other row of characters is in use by a lock-plate 19, (see Fig. 12,) pivoted at its lower end by a screw 20 to the pillar or post b of the machine. The plate 19 is formed with a lip 21, (see Fig. 3,) which embraces the annular shoulder of the cone-shaped hub 16 of the crank 15, and with a thumb-piece 22, by which it is vibrated upon its pivot 20, the vibration being limited by a screw 23, passing through a slot 24 and threaded into the pillar b. A coil-spring 25, having one end attached to the plate 19 and its other end to a stud 26, returns the plate to its normal position, and the outer edge of the lip 21 is slightly beveled or rounded, as shown at Fig. 3, so that when the type-wheel shaft 12 is returned automatically to its normal position, as shown at Fig. 6, the cone-face of the hub 16 will force the lip back in an obvious manner, and it will then return and lock the shaft against longitudinal movement until the plate 19 is again vibrated.

I will now proceed to describe the mechanism supported upon the shaft 12 on the opposite or front side of the reciprocating plate c.

Figure 27:
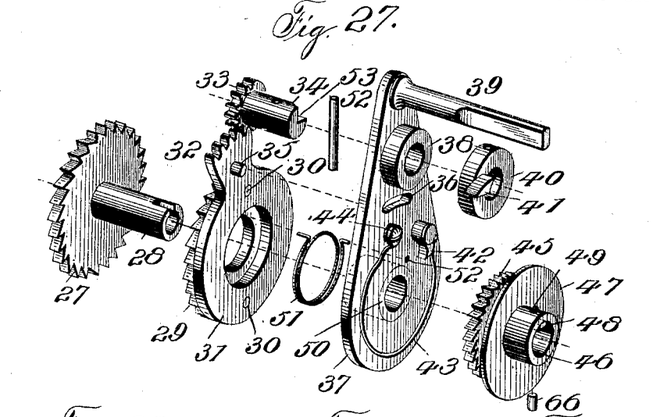
Fig. 27, a detail perspective view of the escapement and mainspring-winding ratchet-wheels disassembled.

At Fig. 27 I have shown in perspective the several parts constituting the escapement and mainspring-winding ratchet-wheels, and special reference is made to this figure and also to Figs. 6 and 7.

27 is the mainspring-winding ratchet-wheel, which is formed or provided with a hub or tubular shaft 28.

29 is a ratchet-wheel secured by rivets or pins 30 to a disk 31, formed with a radial extension-gear 32, adapted to mesh with a pinion 33, fixed on the end of the escapement-shaft 34. The radial extension 32 of the disk 31 is provided with a pinion 35, adapted to enter and vibrate within an arc-shaped slot 36 in a plate 37 of the shape shown and provided near its reduced or small end with a hollow hub 38 and an extension-arm 39, adapted to enter a slot and to establish a fixed relation with the dial, hereinafter referred to.

40 is the escapement-disk, provided with a radial dog 41 on its face at one side of the center.

42 is a dog pivoted to the face of the escapement-carrier plate 37, and 43 is a spring secured at one end to said plate by a screw 44, the free end of the said spring bearing against the outside face of the dog 42 to hold it in contact with the ratchet-wheel 45, formed with a tubular hub 46, on which is located a disk-plate 47, which constitutes a cover or face-plate to the mainspring-box presently explained.

48 is a feather secured on the interior of the hub 46 of the ratchet-wheel 45 by a pin 49, which projects slightly beyond the outside of the hub and is beveled, as shown, to catch and hold one end of the mainspring presently described. The ratchet-wheel 29 and disk 31 are cut out centrally, as most clearly shown at Fig. 27, the opening in the former being of a diameter sufficient to receive the tubular hub 50 (shown in dotted lines) and the opening in the disk 31 being slightly larger in diameter, so as to leave an annular space around the hub 50 as a housing for a spring 51, the free ends of which are bent outwardly, as clearly shown, so that one end may enter a hole 52 in the plate 37 and the other end may enter a similar hole in the face of the ratchet-wheel 29, which spring operates to return the disk to its normal position after it has been partially rotated by a pawl operating upon the ratchet-wheel 29 to operate the escapement, as will be more fully explained.

In assembling the several parts shown at Fig. 27 the ratchet-wheel 27, ratchet-wheel and disk 29 31, plate 37, ratchet-wheel 45, and disk-plate 47 are all placed upon the main shaft 12 in the relation shown in Figs. 6 and 7 and the pin 66 passed through the hub 46, and tubular shaft 28 holds them in proper relation. The escapement-shaft 34 is then passed through the hub 38 of the plate 37, and the escapement-disk 40 is secured on the end of said shaft by a pin 52. The escapement-shaft projects beyond the escapement-disk 40 a distance equal to the thickness of the tooth 41 and is formed with an escapement-notch 53.

Figure 26:
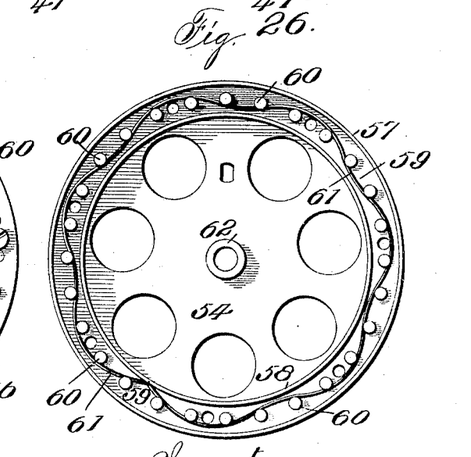
Fig. 26, a like view showing the pin-spring cover removed and the spring engaging the pins to hold them in place.

54 is what I denominate a "pin-disk" provided with a ring-cover 55, the two secured together by screws 56. The disk has an annular flange 57 and a concentric annular wall 58, (see Fig. 26,) constituting an annular box through which pass a series of pins 60, having circumferential grooves (shown at Figs. 2, 3, 6, and 7) into which a sinuous spring 61 finds its way to hold the pins in either of the positions shown at Figs. 2 and 3. The pin-disk 54 is adapted to pass onto the main shaft 12 and is formed with a hub 62 on the outer face and a circular mainspring box or housing 63 on the opposite face, (see Fig. 16,) which has an interiorly projecting and beveled stud 64, similar to the stud 49 on the hub of ratchet-wheel 45, to receive one end of the mainspring 65. The studs 49 and 64 are beveled in reverse directions and the two ends of the mainspring 65 are formed with slots to receive the studs 49 and 64, and they naturally seek their positions over said slots in an obvious manner, and consequently when the ratchet-wheel is rotated, and with it the hub 48, the mainspring 65 is wound up and is held by the spring dog or pawl 42 interlocking with the ratchet-wheel 45, and hence its power is exerted to rotate the pin-disk 54. The mainspring is thus wound at each descent of the vertically-reciprocating plate by a pawl 66, pivoted to the end of a C-shaped lever 67, vibratively connected at 68 to the vertical pillar or post $b$, interlocking with the ratchet-wheel 27, and as the wheel descends with the plate $c$, the pawl-lever 68 being connected with the pillar $b$, the pawl necessarily pulls upon the ratchet-wheel and rotates the same. The pawl 66 is held in operative position by a spring (shown in dotted lines at Figs. 8, 9, 10, and 11) and extending from a stud on the lever 67 to the heel of the pawl. The pawl-lever 67 is extended beyond the pivot 68 and is formed with a flat arm 69, bearing against the lower end of a spring piston or bolt 70, located in a suitable box 71, formed with the pillar $b$, as clearly shown at Figs. 8, 9, and 10, or extended and its end connected by a spiral spring 72 to the base-plate $a$ by an adjustable eyebolt 73, as shown at Fig. 11. Thus when the mainspring offers a resistance greater than the spring-bolt 70 or spiral spring 72 the lever 67 will be vibrated upon its pivot 68 against the spring-bolt 70 (or coil-spring 72) as the plate $c$ descends and will travel with it, and consequently the dog 66 will not operate to revolve the ratchet-wheel 27, and therefore the mainspring cannot be overwound. The upward movement of the lever 67 with the spring-dog is limited by a suitable stop 74, secured in the pillar or post $b$.

Figure 8:
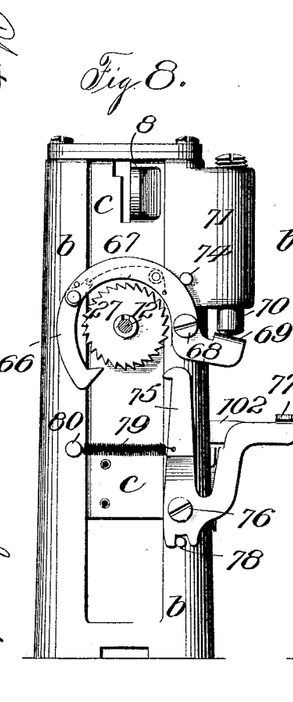
Fig. 8, a front elevation of the head of the ma­chine, all parts being removed except the mainspring ratchet-wheel and the mainspring­winding pawl and escapement-releasing pawl.
Figure 9:
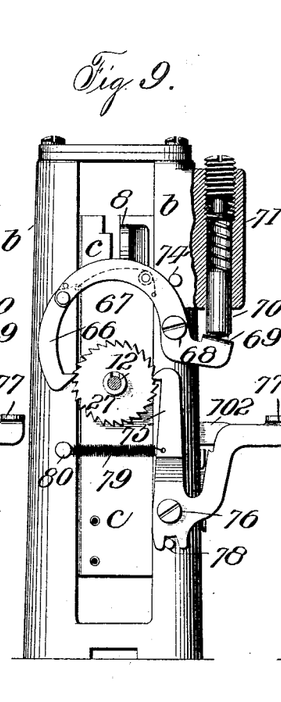
Fig. 9, a similar view showing these parts when the slide has descended to print.
Figure 10:
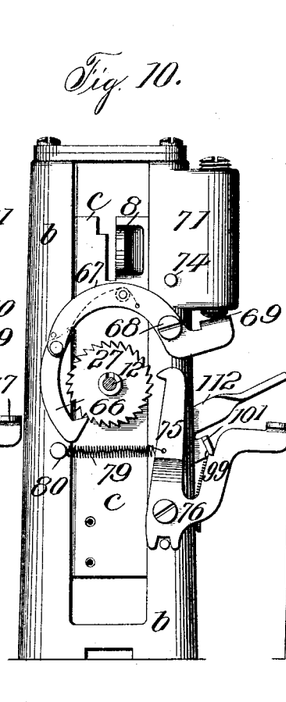
Fig. 10, a like view of the slide in the same posi­tion, but showing the mainspring-winding pawl in its position when the tension of the former has become greater than that of the pawl-lever spring and showing the escape­ment-releasing pawl when held in its opera­tive position.
Figure 11:
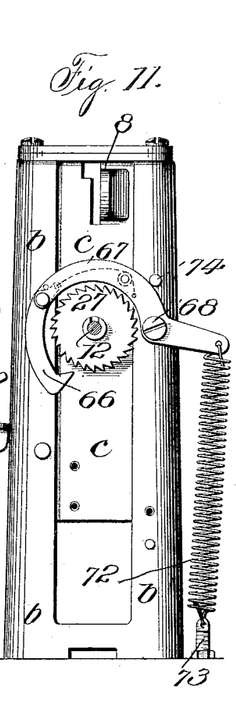
Fig. 11, a similar view showing another form of mainspring-winding mech­anism.
Figure 12:
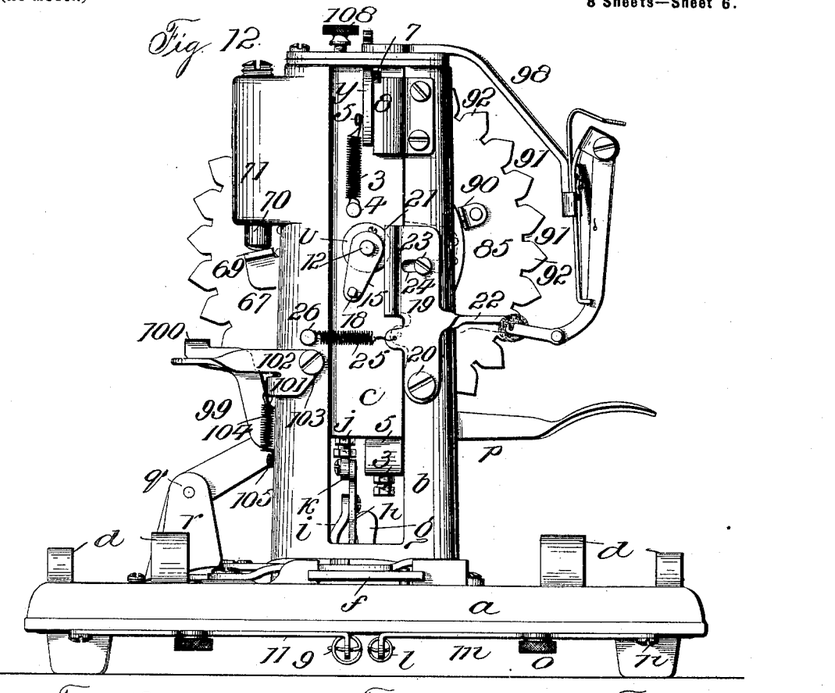
Fig. 12, a rear elevation of the head of the machine, the type-wheel being removed and the ink-frame swung to one side.
Figure 13:
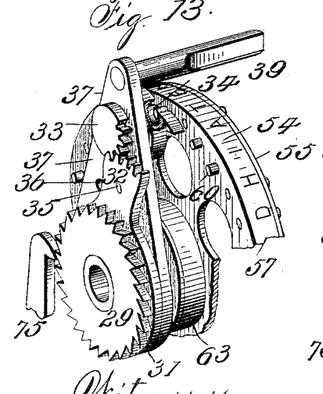
Figs. 13 and 14 are perspective views of a portion of the escapement and pin disk, showing, respectively, the position of the parts when the slide has descended to print and then raised sufficiently to allow the escapement to be released.
Figures 16, 17, 18, 19, 20, 21, 22, 23, 24:
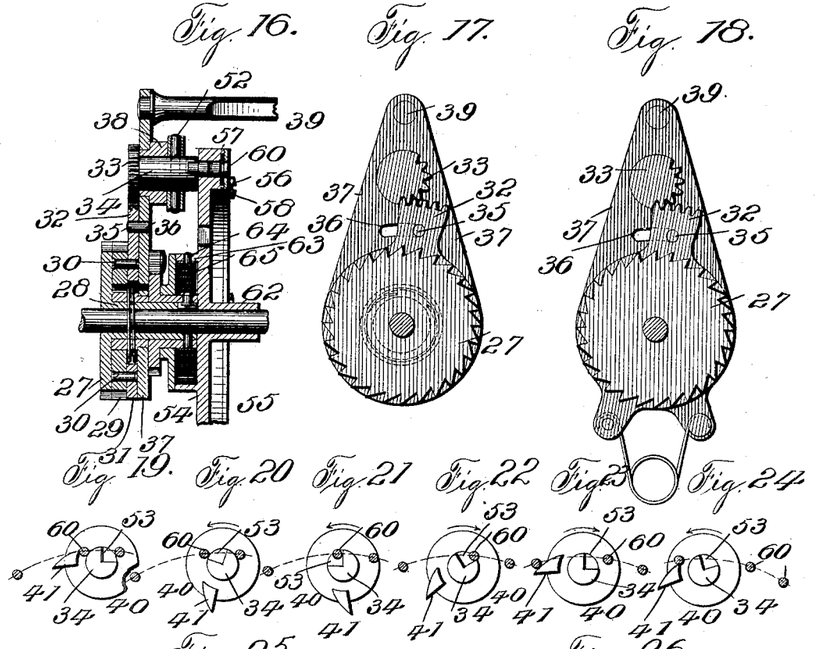
Fig. 16, a detail section of the escapement and pin disk.
Fig. 17, a rear elevation of the escapement-carrier, the spring for returning the escapement to its inoperative position being shown in dotted lines.
Fig. 18, a similar view showing a modification of the same with the spring on the outside.
Figs. 19 to 24 are diagrammatic views of the escapement, showing the passage of one pin through the same.
Figure 25:
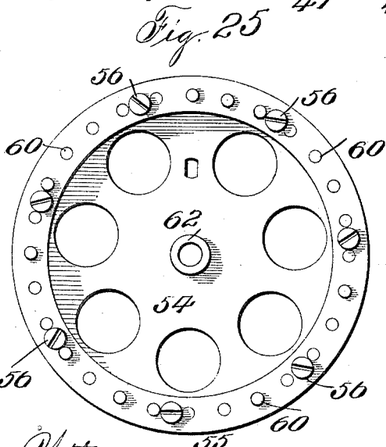
Fig. 25, a front elevation of the pin-disk.

75 is a vibratory dog-plate pivoted at 76 to the pillar $b$ and formed with a hand lever or key 77 by which it may be vibrated, and its vibration is limited by a stud 78, as clearly shown at Figs. 8, 9, and 10. This dog is held in a vertical plane by a coil-spring 79, connecting the dog with a stud 80 on the pillar $b$, and as the plate $c$ and the mechanism mounted upon the shaft 12 descend the upper curved edge of the dog striking the ratchet-teeth on the ratchet-wheel 29, secured to the escapement-carrier plate 31, will be forced outwardly against the action of the coil-spring 79; but when the plate $c$ and shaft 12, with the mechanism mounted thereon, ascend the dog will grasp a ratchet-tooth on the wheel 29 and turn it a distance proportioned to the vertical movement of the plate $c$, and hence the disk 31 will be accordingly rocked or rotated upon the tubular shaft or hub 28 and the radial extension-gear 32, meshing with the escapement-pinion 33 on the escapement-shaft 34, the pinion 33 and its shaft will be correspondingly rotated, and with them the escapement-disk 40, thus releasing the pin 60 of the pin-disk 54, held against the periphery of the escapement-shaft and between it and the heel of the dog 41 in the position shown, Figs. 13 and 19, allowing the pin-disk under the action of the mainspring to rotate until the next succeeding one of the pins 60 reaches the position occupied by the preceding one before its releasement. The continued rotative movement of the pin-disk 54 is arrested and the relation of the parts shown in Figs. 13 and 19 is effected by the reversal of the rotative or rocking movement of the extension-gear 32, which is produced by the restoring action of the spring 51. (See Fig. 27.) As the pin-disk 54 is rotated by the release successively at each vertical reciprocation of the plate $c$, the type-wheel is progressively rotated with its shaft, and the distance it is rotated will depend altogether upon the distance between the pins projecting from that side of the pin-disk adjacent to the escapement devices, and as the dial hereinafter referred to remains stationary during this movement of the pin-disk and type-wheel the relation between the dial and the characters thereon and the characters upon the type-wheel is necessarily and automatically changed, and hence in the use of the dial-plate as a type-selecting device it will be impossible to know what character will be printed by the type-wheel, as will be hereinafter more fully explained.

Figure 14:
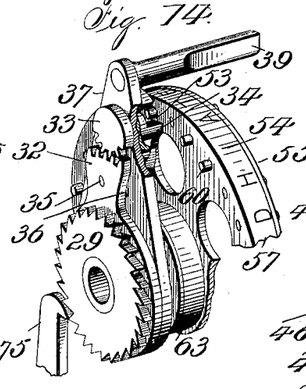
Figure 15:
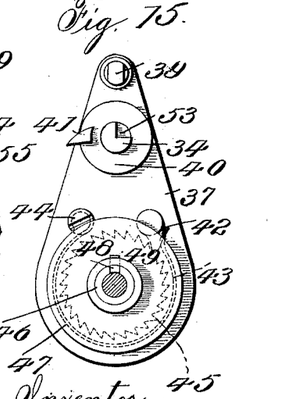
Fig. 15, a front elevation of the escapement-carrier and mainspring-winding arbor.

I desire to have the escapement fully understood, and in Figs. 19 to 24, which are diagrammatic views, the passage of one of the pins 60 of the pin-disk may be readily traced, and in these figures I will designate only one pin 60, to whose movement attention is directed. Fig. 19 shows the parts at a state of rest and making a fixed relation between the type-wheel and the type-selecting dial (presently explained) and with the pin 60 between the periphery of the escapement-shaft 34 and the heel of the dog 41. The plate c is reciprocated vertically and carrying with it the devices heretofore described, the ratchet-wheel 29 passes freely downward in the path of the spring-dog plate 75, and as the plate c ascends after the type-wheel has made its impression upon the paper on the paper-carriage the lip of the dog 75 meshes with one of the teeth of the ratchet-wheel 29 and rotates it a distance commensurate with the upward movement of the plate c, and accordingly the extension or radial gear 32 rocks the pinion 33 and escapement-shaft 34, as hereinbefore stated. As the escapement-shaft rocks or rotates into the position shown at Fig. 20 the pin 60 of the pin-disk, which occupied the locked position between the periphery of the escapement-shaft and the heel of the dog, as illustrated at Fig. 19, starts into the notch 53 of the shaft 34 and meets and is arrested by the face of notch when the escapement reaches the position illustrated at Fig. 21. This extreme movement of the escapement is accomplished just as the ratchet-wheel 29 and dog-plate 75 become disengaged, as shown at Fig. 14, and by the time the carrying-plate c has completed its upward movement the spring 51 (see Fig. 27) causes the ratchet-wheel 29 and extension-gear 32 to start and return to their normal position, and consequently the rotative movement of the escapement-shaft and dog has been reversed, as represented, Figs. 22 and 23, and the pin 60 of the pin-disk, which was in the notch 53, as shown at Fig. 21, has been permitted to travel in its progressive movement first to the position shown at Fig. 22 and then to escape from contact with the face of the notch 53 to the locality shown at Fig. 23, the escapement making a slight reverse movement, and allowing the next succeeding pin to pass over the curved face of the dog 41, as shown at Fig. 24, to assume the locked position similar to that shown at the start, Fig. 19, of the designated pin 60.

Figure 5:
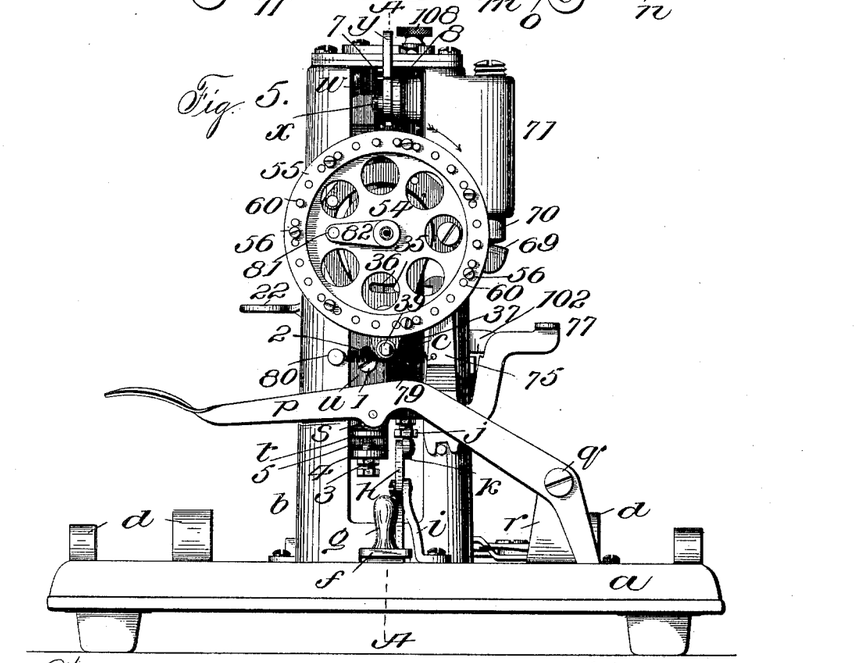
Fig. 5, a front elevation of the head of the machine, the dial being removed.

As the pins 60 are successively released in the manner just explained the mainspring 65 causes the pin-disk to rotate to the right, as indicated by the arrow in Fig. 5, and as the pin-disk is interlocked with the arm 81, projecting from a crank-arm 82, extending radially from the hub 83, which is secured in fixed relation with the type-wheel shaft 12 by a pin 84, it is obvious that the type-wheel shaft and the type-wheel are rotated to the same extent as the pin-disk 54.

The hub 83 is located within a cylindrical recess of a stem 84', (see Figs. 6 and 7,) to which the dial-plate 85 is rigidly attached by screws 86, and the stem 83 is furnished with an operating-knob 87.

The type-wheel shaft is rotatively connected with the stem 83 by a screw 88 and washer 89.

Figure 1:
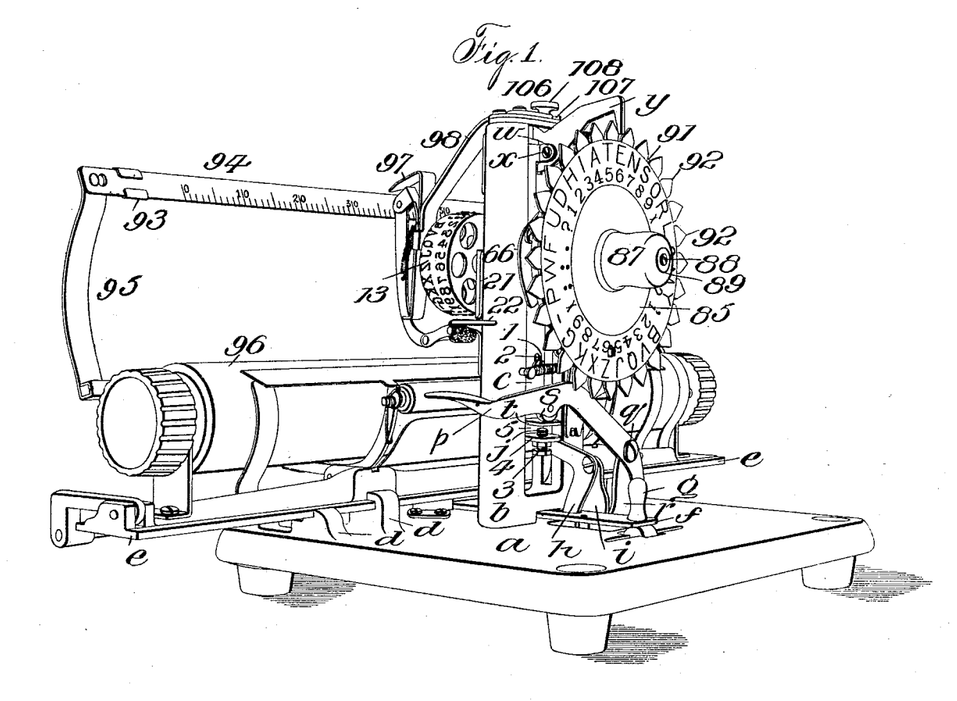

The face of the dial-plate 85 is provided with characters corresponding with the characters on the type-wheel, as clearly shown at Fig. 1, and the periphery of the pin-disk 54 is provided with characters corresponding with the main characters of the type-wheel and also those of the dial-plate. The inside face of the dial-plate has secured thereto a pointer (see Fig. 12) leading to the characters on the periphery of the pin-disk, so that the pin-disk can be rotated by the reciprocating movement of the plate c, so as to bring any desired character on its periphery opposite or in line with the pointer 90 for the purpose hereinafter explained.

As the extension-arm 39, projecting from the plate 37, interlocks with a corresponding hole in the dial-plate 85, as clearly shown at Figs. 6 and 7, and as the stem 83 and knob 87 are fixed to the type-wheel shaft and the arm 81 of the crank 82 interlocks with the pin-disk in a similar manner to the arm 39 it will be seen that the type-wheel shaft and all the parts mounted thereon can be freely rotated by the knob 87 when the plate c, in which the shaft is journaled, is in its elevated and normal position. The periphery of the dial-plate is formed with a series of notches 91 in the same radial planes with the characters on the face of the plate, and each side of these notches the plate is beveled to constitute points 92. The notches 91 are adapted to receive and pocket the lower edge of the vibrating detent or lock-bar y, the beveled sides of the points or projections 92 serving to guide the detent into the pockets or notches 91 in an obvious manner. From this construction and operation it will be seen that in printing any given matter the dial is rotated so as to bring the successive letters and characters of the said message in line with the detent y, and at the same time the type-wheel shaft and type-wheel, as well as all the mechanism mounted on the type-wheel shaft, are correspondingly rotated. Pressure is then applied to the operating hand-lever p, which first brings the detent y into the notch in line with the character of the message which is to be printed (or, rather, which is to be printed in another character) and holds all of the rotative parts in fixed relation with each other until the impression has been made upon the paper on the paper-carriage, which had been brought into printing position by the rotation of the dial-plate. After the impression has thus been made the lever p is released and the spring 9 pulls the feed-plate f back and the bell-crank lever being rocked on its pivot through the medium of spring 9, and spring l in an obvious manner raises the carrying-plate c and the mechanism mounted therein upwardly to its normal position, which movement causes the winding of the mainspring and the rotation of the escapement-shaft and consequent movement of the pin-disk, as hereinbefore explained.

The distance the pin-disk rotates as a result of the escapement movement will depend entirely upon the position of the pins 60, and as they are free to be moved so as to project through either face of the disk it will be seen that an arbitrary code may be established, because the characters printed by the type-wheel will be absolutely dependent upon the amount of escapement or rotation made by the pin-disk after each impression has been made by the type-wheel. The code therefore is established by a determination as to two conditions: first, the relation of the pins 60, projecting from the inside face of the pin-disk 54, and, second, the relation between said pin-disk and the dial-plate 85. The first condition is established by the relation of the pins 60 to the characters on the periphery of the pin-disk and the second condition by the relation of the characters on the pin-disk with the stationary pointer 90 on the dial-plate 85, all of which can be agreed upon beforehand between the sender and the receiver of messages. From the relations of the several parts and the irregular progressive action of the type-wheel it will be seen that as the dial-plate is rotated to bring the successive letters or characters of the message to be printed into alinement with the detent or latch $y$ the characters printed upon the paper on the paper-carriage will depend altogether upon the amount or extent of the escapement given to the pin-disk 54, as hereinbefore described. When the message has been printed, it will be found to be a continuous row or line of letters and characters, apparently meaningless; but to translate said message it is placed between slides or clasps 93 on the scale-bar 94, held on the ends of arms 95, secured to the bell-bar of the paper-carriage 96, and the paper-carriage is adjusted so that the pointer 97 on the ink-roller frame 98 will point to the first letter or character of the printed message. The pin-disk is then rotated by the reciprocation of the plate $c$ until the same letter or character is brought opposite or in line with the pointer 90, which occupied such relation or position when the printing of the original message was begun, (such letter or character constituting the key and being known to both the sender and receiver of the message.) The dial-plate 85 is then rotated to bring the letter or character on its face corresponding with the letter of the message, and pressure is applied to the lever $p$, whereupon the type-wheel will print the translation of the first letter of the message or reproduce the first letter of the original, and so on with each successive letter of the code message. Any code agreed upon may be changed by altering the relations of the parts, as hereinbefore described.

It will be seen that the dial-plate is provided with two concentric rows of characters corresponding with the two rows of characters on the type-wheel, and the type-wheel is shifted to print from the inner circle of characters on the dial-plate by pushing the shaft 12 rearward, which can be done when the lip 21 on the vibrating plate 19 is withdrawn from the annular shoulder of the cone-shaped hub 16, as hereinbefore fully described.

When it is desired to print repeatively any character on the type-wheel, the dog-plate 75 is vibrated away from the path of the ratchet-wheel 29, and consequently said ratchet-wheel will not be rotated during the upward movement of the plate $c$. In order to avoid the necessity of holding the dog-plate in this position by hand, the dog-plate is provided with an oblique or inclined arm 99, (see Fig. 12,) terminating in a finger-plate 100. The inner edge of this oblique arm is formed with a notch (shown in dotted lines at Fig. 12) to receive the lower edge of a forwardly-extended arm 101 on a thumb-plate 102, pivoted at 103 to the pillar $b$ and connected by a spiral spring 104 with a stud 105. When the plate 102 is raised against the action of spring 104, the forwardly-extended arm 101, bearing against the inclined edge of the arm 99 of the dog-plate 75, will cause the latter to vibrate on its pivot away from the path of the ratchet-wheel 29, and when the arm 101 reaches the notch in the edge of the dog-plate arm 99 it will interlock therewith and hold the dog-plate until it is released by vibrating the lock-plate away from the pillar $b$, whereupon the spring 104 will pull the locking-arm and its plate down until it is arrested in its movement by the contact of the arm 101 with the pillar or frame $b$.

The inking-roller frame 98 is secured in position to the top of the pillar $b$ or frame through medium of a headless screw 106, constituting a pivot passing through one end, a lateral horizontal extension of the frame 98, the oppositely-extended portion of the frame being formed with a gateway 107 (see Fig. 1) to pass the body of a binding-screw 108. When the binding-screw 108 is loosened, the inking-frame may be vibrated upon the headless screw 106, so that it will be out of the way when it may be desirable to remove the type-wheel from its shaft, and when it may be desirable to disengage the inking devices entirely from the machine the frame may, after first vibrating it from under the binding-screw, be lifted bodily off of the headless pivot-screw 106.

While I have shown and described a machine which is especially adapted to carry out the purposes of my invention, it will be understood that it may be varied in many particulars without departing from the spirit of my invention, which involves the generic idea of a machine adapted to write in cipher and to translate the same and in which is employed a type-wheel and means for rotating or positioning the same to bring the various characters thereon into printing position and means independent of the character-positioning device for automatically changing the relative position between the type-wheel and the positioning device.

Having described the construction, operation, and advantages of my improvements, what I claim as new, and desire to secure by Letters Patent, is—

1. In a type-writing machine for writing in cipher, a type-wheel provided with individual type characters, a type-dial, having corresponding type characters, means intermediate of the type-wheel and the type-dial for causing the type wheel and dial to move coincidently and means for automatically changing the relative positions of the type-wheel and type-dial, substantially as and for the purposes set forth.

2. In a type-writing machine for writing in cipher, a type-wheel provided with type characters, a type-selecting dial or disk provided with characters similar to the type-wheel, means for establishing coincident movement between the type-selecting dial and the type-wheel previous to printing, and means for automatically changing the relation between the type-wheel and the type-selecting dial or disk after the impression has been made by the type-wheel, substantially as hereinbefore set forth.

3. In a type-writing machine for writing in cipher, a type-wheel, a type-dial for positioning the characters of the type-wheel, and means for automatically changing the relation between the type-wheel and the type-dial, all mounted upon a single shaft, adapted for vertical movement within a supporting pillar or post, means for holding the type-wheel and type-dial in fixed relation during the vertical printing movement of the type-wheel, and means for automatically changing the relation between the type-wheel and type-dial, during the upward or return movement of the shaft, substantially as set forth.

4. In a type-writing machine for writing in cipher, a type-wheel provided with individual type characters, a type dial or indicator having type characters corresponding with those upon the type-wheel, means intermediate of the type-wheel and the type dial or indicator for causing the type-wheel and dial or indicator to move coincidently, and means for automatically changing the relative positions of the type-wheel and dial or indicator substantially as and for the purpose set forth.

5. In a type-writing machine for writing in cipher, a type-wheel mounted upon a rotative shaft and having type characters disposed upon its periphery, a type-positioning device mounted upon the type-wheel shaft, means for changing the relation between the type-wheel and positioning devices consisting of a spring-actuated disk fixed in relation to the type-wheel shaft and provided with a series of adjustable projecting studs, and a spring-actuated escapement mechanism rotatively mounted upon the type-wheel shaft, and having a fixed relation with the type-positioning device, substantially as and for the purposes set forth.

6. In a type-writing machine for writing in cipher, a supporting-bed with a bifurcated pillar or post erected thereon, a vertically-reciprocating plate mounted in the pillar or post, a type-wheel shaft rotatively mounted in the reciprocating plate, a type-wheel, type-positioning devices and spring-actuated means for changing the relation between the type-wheel and type-positioning devices, mounted upon the type-wheel shaft, means for reciprocating the shaft-supporting plate and also the spring-actuated devices for changing the relation between the type-wheel and type-positioning devices, substantially as hereinbefore set forth.

7. In a type-writing machine for writing in cipher, the bed $a$, pillar $b$, and reciprocating plate $c$, in combination with the shaft 12, type-wheel 13, ratchet-wheel 27, ratchet-wheel 29, disk 31, gear 32, pinion 33, escapement-shaft 34, plate 37, having hub 38, and extension-arm 39; escapement-disk 40, dog 42, spring 43, spring 51, ratchet-wheel 45, spring 65, disk 54, with movable studs 60, arms 81, crank 82, hub 83, stem 84, dial 85, all combined and arranged as described, and the operating-lever $p$, pawl 66, dog-plate 75 and detent $y$, substantially as and for the purposes set forth.

8. In combination with the mainspring 65, ratchet-wheel 27, and pawl 66, the vibrating lever 67, formed with an arm 69, and the spring-bolt 70, substantially as and for the purposes set forth.

9. In combination with the ratchet-wheel 29, disk 31, having gear extension 32, the plate 37, having arm 39, interlocking with the dial 85, the pinion 33, on the shaft 34, and formed with the recess 53, the escapement-disk 40, having dog 41, and the spring-actuated pin-disk 54, provided with adjustable pins 60, substantially as and for the purposes set forth.

10. The disk 54, provided with a series of circumferentially-disposed pins, 60, having circumferential grooves, in combination with a single spring 61, sinuously laced as shown, whereby the pins may be adjusted, and held in position, as and for the purpose set forth.

11. In combination with the reciprocating plate carrying the printing mechanism and type positioning and changing mechanism, the operating-lever $p$, vibrating detent $y$, having a stud 7, and a stop-plate 8, secured to the plate $c$, substantially as and for the purpose set forth.

12. In combination with the ratchet-wheel 29, and spring dog-plate 75, for operating the same, the thumb-plate 102, vibratively connected with the pillar $b$, and provided with an arm 101, adapted to interlock with a notch in the dog-plate 75, to hold the latter out of the path of the ratchet-wheel 29, substantially as and for the purpose set forth.

13. In combination with the axially-reciprocating type-wheel shaft 12, and the type-wheel 13 having two circumferential rows of type characters, the crank 15, hub 16, and the vibrating spring-plate 19, provided with a lip 21, and operating thumb-piece 22, substantially as and for the purpose set forth.

14. In combination with the bed-plate $a$, pillar b, reciprocating plate c, and mechanism for lowering the plate c, the bell-crank lever h, and coil-spring i, substantially as and for the purpose set forth.

15. In combination with the rotative dial-plate 85, mounted upon the type-wheel shaft 12, and provided with a pointer 90, the pin-disk 54, provided with adjustable pins 60, and circumferential type characters, substantially as and for the purpose set forth.

16. The ink-roller frame 98 having its head formed with a gateway 107, and secured in position by a headless screw 106, and a binding-screw 108 substantially as and for the purpose hereinbefore set forth.

17. In combination with the paper-carriage 96, carrying a scale-bar 94, and message-clamps 93, the ink-roller frame 98, provided with a fixed pointer 97, substantially as and for the purpose set forth.

In testimony whereof I affix my signature in presence of two witnesses.

GEO. C. BLICKENSDERFER.

Witnesses:
JOHN DAVENPORT,
JOHN A. LE BOUTILLIER.